Sept. 7, 1954 R. HABERL 2,688,491
CHUCK FOR HOLDING-TOOLS OF DIFFERENT SHANK DIMENSIONS
Filed April 4, 1951 3 Sheets-Sheet 1
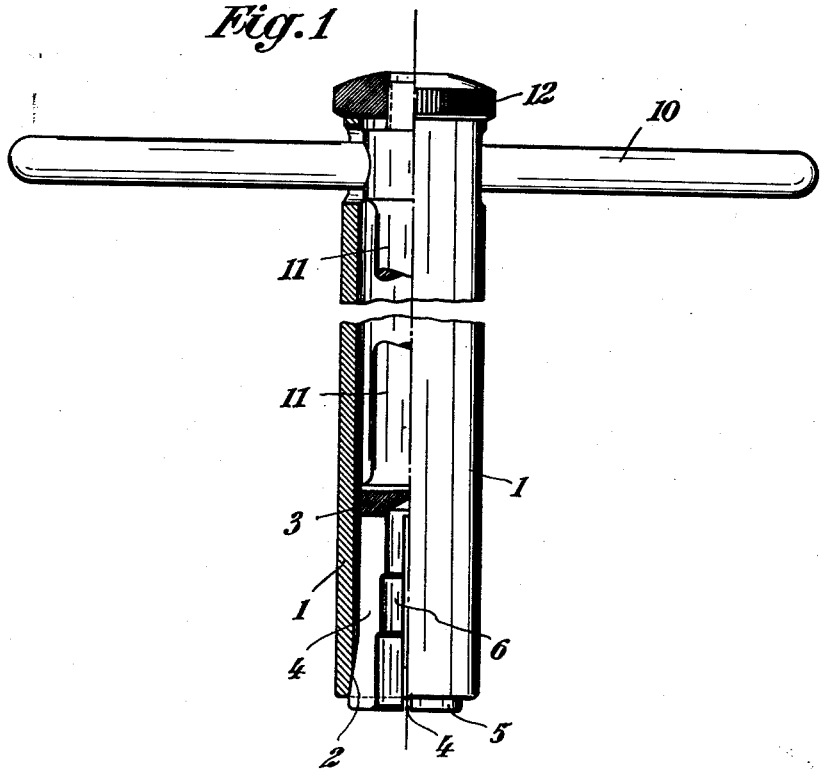
INVENTOR.
RUDOLF HABERL
BY
K. B. Mayr
ATTORNEY.

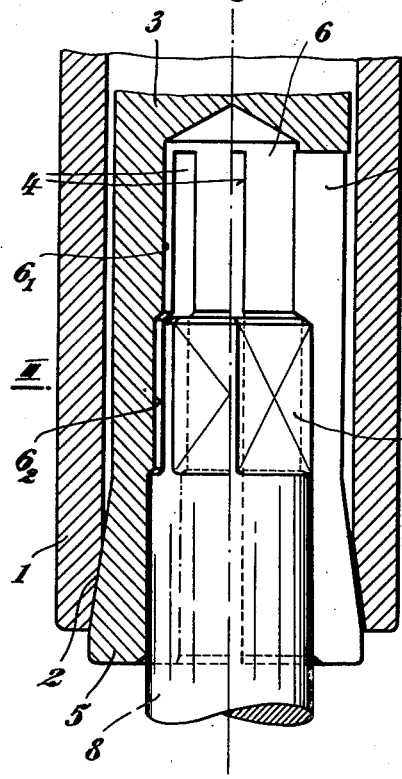
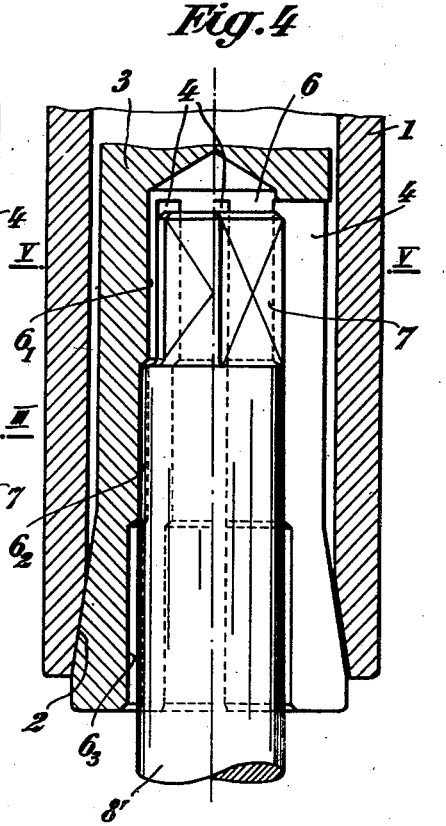
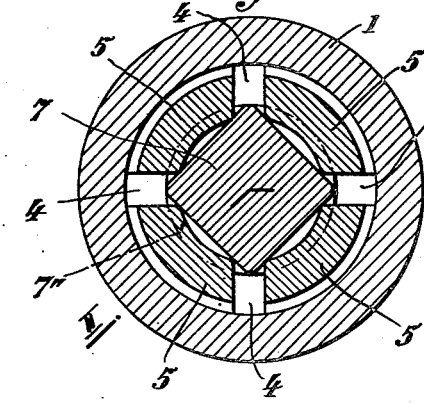
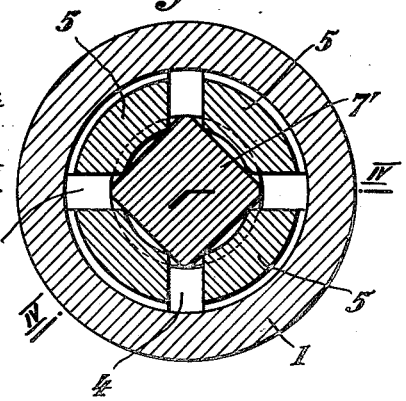

Sept. 7, 1954 R. HABERL 2,688,491
CHUCK FOR HOLDING-TOOLS OF DIFFERENT SHANK DIMENSIONS
Filed April 4, 1951 3 Sheets-Sheet 3

INVENTOR.
RUDOLF HABERL.
BY
ATTORNEY.

Patented Sept. 7, 1954

2,688,491

UNITED STATES PATENT OFFICE 2,688,491

CHUCK FOR HOLDING TOOLS OF DIFFERENT SHANK DIMENSIONS

Rudolf Haberl, Salzburg, Austria

Application April 4, 1951, Serial No. 219,170

Claims priority, application Austria April 6, 1950

3 Claims. (Cl. 279—53)

Holders for tools or machine elements have been suggested which are adapted to hold and grip several sizes of tools or elements. For this purpose the holder is provided with one or several flexible inserts. According to another suggestion the chuck is separated from the pull or push shank so as to form a separate, detachably connected element of construction affording gripping of sets of tools by the insertion of chucks having gripping profiles of different size and type.

The present invention relates to a holder with a jaw-type chuck for manually operable tools, such as a screw tap, hand reamers, or the like, which are provided with a cylindrical shank and a square. The object of the invention resides in the provision of a simplified chuck for holding tools of different shank dimensions, the interior of the slotted chuck being set off in steps for the selective insertion of the square of different sizes of tools. The height of the step or steps is so chosen that the cylindrical shank of the tool gripped at any time is engaged by the interior wall of the next larger cut-out.

In the accompanying drawings the subject of the invention is illustrated in an embodiment, shown by way of example, for selectively gripping three different tool sizes.

Fig. 1 is a part sectional elevation of a tool holder according to the invention.

Figs. 2 and 3 show a longitudinal section and cross section, respectively, taken through the gripping parts of the holder along the line II—II of Fig. 3 and the line III—III of Fig. 2, respectively.

Figs. 4 and 5 show similar sectional views taken along the lines IV—IV in Fig. 5 and V—V in Fig. 4, respectively, the smallest tool of the set being inserted instead of the medium size tool shown in Figs. 2 and 3.

Like parts are designated by like numerals in all figures of the drawing.

Figure 6:
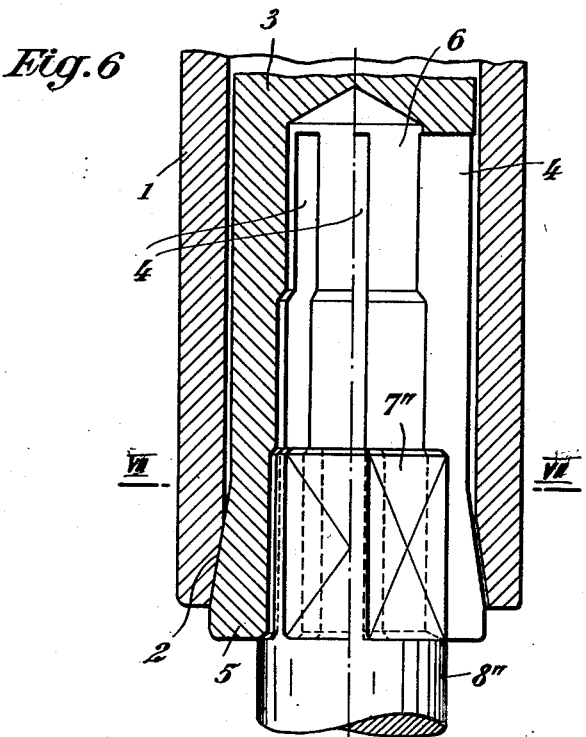
Fig. 6 is a longitudinal sectional view of a tool holder with a large diameter tool inserted, the section being taken along line VI—VI in Fig. 7.
Figure 7:
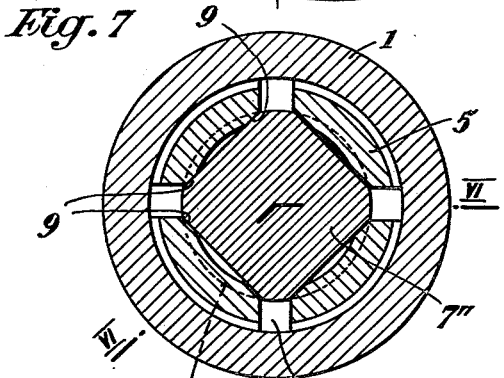
Fig. 7 is a cross section taken along line VII—VII of Fig. 6.
Figure 8:
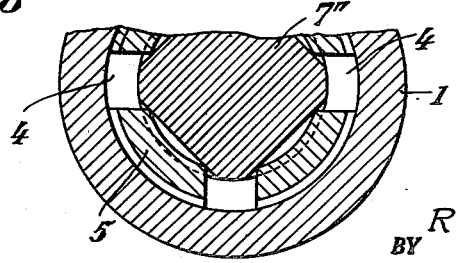
Fig. 8 is a sectional view as Fig. 7 of a tool holder of slightly modified design.

The holder consists of a conventional sleeve 1, the lower end of which has an internal, outwardly tapering surface 2 and which can be turned by means of a cross bar 10 provided at its upper end and serving as a handle. A chuck 3 is fitted into the lower end of the sleeve 1 and is made integral with a chucking shank 11 (Fig. 1) extending through the sleeve 1, but may also be detachably connected with the chucking shank in a suitable manner, if desired. The lower end of the chuck 3 has a tapering outside surface which, as the chucking shank is pulled upwardly by means of a conventional chucking nut 12, causes the jaws of the chuck to be pressed together for gripping the tool. The chuck 3, which has conventional transverse slots 4 for forming jaws 5, has a stepped bore 6. The sections $6_1$, $6_2$, $6_3$ of the interior surface of the bore, which is set off in steps, have a length which is slightly larger than that of the squares of the tools to be chucked, the respective diameter of the sections of the bore corresponding approximately to the shank diameters of the tools of consecutive sizes. The annular shoulders of the several sections of the bore is so chosen, that the cylindrical shank of the tool chucked at any time is engaged by the interior surface of the bore section next to the square. The width of the slots 4 is so chosen that the corners of the squares contact two adjacent gripping jaws 5. As can be seen in Figs. 2 and 3, the corners of the square 7 of the tool extend between the slots 4 of the gripping jaws 5, which contact two sides of the square to secure it against rotation, whereas the shank 8 of the tool is gripped by the interior walls of section $6_3$ when the chuck 3 is tightened. In Figs. 4 and 5 the next smaller one of the set of tools is shown in the chuck, its square 7' extending with its corners into the slots 4 of the section $6_1$, the shank 8' being engaged and gripped by the interior wall of section $6_2$ when the chuck 3 is tightened. Since with the conventional gradation of tool sizes the shank diameters and squares are proportional to each other, the width of the slots 4 between the jaws 5 is the same throughout the length of the chuck. In some tools, however, the proportion between the diameter of the tool shank and the size of the square is not the same as in the other tools of the set. As shown in Figs. 6 to 8 the longest tool which will be gripped by the jaws 5 of the holder has a square 7'' which is larger relatively to the cylindrical shank 8'' than that of the smaller tools which can be held by the tool holder. To take care of this situation, the jaws 5 are belevelled adjacent to the slots 4 (Fig. 7) or that the slots be somewhat widened as is indicated in Fig. 8.

The invention is not restricted to the embodiment described by way of example. For instance, the sleeve 1 may have at its lower end a tapering surface which opens inwardly and co-acts with corresponding mating surfaces of the gripping jaws 5 so that the chuck comes into its effective position by the application of pressure. If desired, the gradation of the sections of the bore 6 may be so chosen that of the conventional sets of tools, such as taps, reamers, and the like, only those sizes which are used frequently are gripped by the chuck. If the chuck is interchangeable, the field of application of the holder can be substantially enlarged by the insertion of a chuck with a differently stepped bore. Instead of the bores $6_1$, $6_2$, $6_3$ . . . stepped cavities of other configurations, for example not circular or cornered shapes may be employed, which, instead of the crosswisely arranged slots 4, may have differently arranged slots.

If the length of the bores $6_1$, $6_2$, $6_3$, . . . or of the cavities is smaller than that of the squares of the tools to be gripped, a greater number of different tool sizes can be gripped in a bore 6 or cavity of the same length. In this way a greater number of steps accommodating a greater number of tools can be arranged in a cavity of a given depth.

What I claim is:

1. A chuck comprising a sleeve member having an end portion whose interior is conical, a chuck member axially slidable in said sleeve member and having a radially slotted portion, said slotted portion having a conical portion conforming with and abutting against the conical interior of the end portion of said sleeve member, and an axial cavity in said slotted portion, said cavity having a plurality of cylindrical portions, the diameters of said cylindrical portions being smaller the deeper the portions are in said cavity, adapting the latter to receive tool shanks of different diameters.

2. A chuck for holding tools of different sizes and said tools having a cylindrical shank with a prismatic end portion, said chuck comprising a sleeve member having an end portion whose interior is conical, a chuck member axially slidable in said sleeve member and having a radially slotted portion, said slotted portion having a conical portion conforming with and abutting against the conical interior of the end portion of said sleeve member, and an axial cavity in said slotted portion, said cavity having a plurality of cylindrical portions, the diameters of said cylindrical portions being smaller the deeper the portions are in said cavity, said cavities receiving cylindrical tool shanks of different diameters and the radial slots extending from the cylindrical portion next to the one receiving the cylindrical tool shank individually receiving the edges of the prismatic end portion of the tool shank.

3. A chuck as set forth in claim 2, the individual cylindrical portions of said cavity being shorter than the prismatic end portions of the tool shanks received therein.

References Cited in the file of this patent

UNITED STATES PATENTS

| Number | Name | Date |
|---|---|---|
| 1,589,287 | Ziegler | June 15, 1926 |
| 2,051,998 | Monroe | Aug. 25, 1938 |
| 2,387,981 | Davis | Oct. 30, 1945 |